A. STILLMAN.
Saw Set.

No. 5,810.  Patented Sept. 26, 1848.

UNITED STATES PATENT OFFICE.

ABEL STILLMAN, OF POLAND, NEW YORK.

SAW-SET.

Specification of Letters Patent No. 5,810, dated September 26, 1848.

*To all whom it may concern:*

Be it known that I, ABEL STILLMAN, of Poland, county of Herkimer, and State of New York, have invented a new and useful Improvement in Saw-Sets for Setting the Teeth of Saws; and I do hereby declare that the following is a clear and exact description of the same, reference being had to the annexted drawings, in which—

Figure 1:
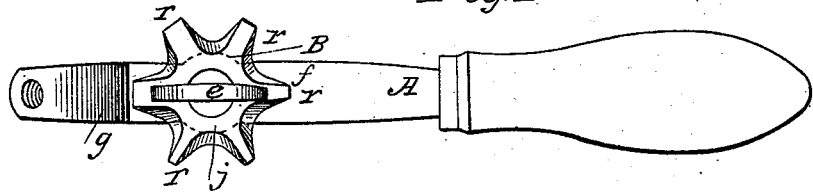
Figure 2:
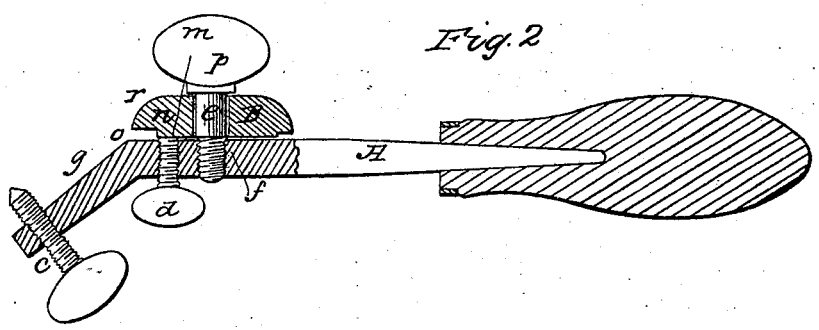

Figure 1 is a plan, and Fig. 2 a vertical longitudinal section.

The same letters have reference to the same parts in the several figures.

Figure 3:
Figure 4:
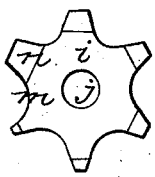

The part A I will name the angle bar, the part B the revolving jaw (of which Figs. 3 and 4 are also representations), the screw $c$ the gage screw, $d$ the adjusting screw, and $e$ the confining screw. The angle bar A may be made as shown in Figs. 1 and 2. The surfaces $f$ and $g$ should be planes, forming a right lined angle of about 45°. The corner O across which the tooth is bent should be sharply defined. The revolving jaw (B) I make with a body or main part $i$ (Figs. 1, 3, 4,) which has a circular hole $j$ through its center at right angles with surface $m$, Figs. 2, 3, 4. The surface $m$ is a plane. The body $i$, Figs. 1, 3, 4, has six or other convenient number of projections $r, r$, (Figs. 1, 3, 4). The surface $n$ of the projections $r, r$, Figs. 2, 3, 4 are planes and parallel to the surface $m$. The length of these projections $(r, r,)$ is such that they reach nearly to the corner (O, Figs. 1, 2,) when the revolving jaw (B) is secured to A, as in Fig. 2. The surfaces $n$ of the projections $r, r$, are depressed from the surface $m$ of the body $i$, Fig. 2, 3, 4. The depth of this depression in any given projection $r, r$, is equal to the thickness of the tooth intended to be set by the use of the said given projection. The offset from the surface $n$, Figs. 2, 3, forms a shoulder against which the point of the tooth bears. This offset is distant from the corner O, Figs. 1, 2, about the length of the given tooth.

The projections $r, r$, differ from each other in respect to their breadth and also in the depth and length of the depressions in them, the object of which is to suit teeth of different dimensions, the revolving jaw B being made so as to revolve around the confining screw $e$, so that any projection can be placed in the proper position for use at pleasure, which position is that of $r$, Fig. 2. The confining screw $e$ has a shoulder $p$ which bears upon the revolving jaw B and when screwed into the angle bar A, Fig. 2, secures them firmly together. The adjusting screw $d$ is to be used (in case the saw to be set is hard and brittle) to elevate the projection to be used $r$, Fig. 2, to increase the space between the surface of the angle bar A and the surface $n$ of the projection, so that the tooth will have more room to bend in the whole of its length, because if it is closely confined so as in only a small part of its length it will be more liable to break.

When a tooth is to be set it is placed in the space between the angle bar A and the projection $r$, Fig. 2, and bent until the blade of the saw touches the point of the gage screw $(c.)$ I do not claim as my invention the use either separately or in combination of an angle bar, jaws, gage, and adjusting screw, for the purpose of setting saws; but—

I do claim as my invention, and desire to secure by Letters Patent—

The revolving jaw having at the ends of its arms depressions of different lengths and depths, and lengths for different teeth, in combination with the angle bar and adjusting screw, substantially as herein described.

ABEL STILLMAN.

Witnesses:
JUDSON KNIGHT,
MILTON WHEATON.